(12) United States Patent
Puschmann et al.

(10) Patent No.: US 12,442,565 B2
(45) Date of Patent: Oct. 14, 2025

(54) COOLING UNIT

(71) Applicant: SECOP GMBH, Flensburg (DE)

(72) Inventors: Olaf Puschmann, Wanderup (DE); Sebastian Echelmeyer, Flensburg (DE)

(73) Assignee: SECOP GMBH, Flensburg (DE)

( * ) Notice: Subject to any disclaimer, the term of this patent is extended or adjusted under 35 U.S.C. 154(b) by 161 days.

(21) Appl. No.: 18/272,836

(22) PCT Filed: Jan. 18, 2022

(86) PCT No.: PCT/EP2022/051031
§ 371 (c)(1),
(2) Date: Jul. 18, 2023

(87) PCT Pub. No.: WO2022/157154
PCT Pub. Date: Jul. 28, 2022

(65) Prior Publication Data
US 2024/0302080 A1    Sep. 12, 2024

(30) Foreign Application Priority Data

Jan. 19, 2021 (EP) .................... 21152370

(51) Int. Cl.
*F25B 7/00* (2006.01)
(52) U.S. Cl.
CPC .................... *F25B 7/00* (2013.01)
(58) Field of Classification Search
CPC ........................................ F25B 7/00
See application file for complete search history.

(56) References Cited

U.S. PATENT DOCUMENTS 6,766,652 B2 * 7/2004 Kelly .............. F25D 11/022
                                                 62/199
2009/0113917 A1   5/2009 Takasugi
(Continued)

FOREIGN PATENT DOCUMENTS

DE   10 2010 028526 A1   11/2011
DE   10 2017 211285 A1    1/2019
(Continued)

*Primary Examiner* — Miguel A Diaz
(74) *Attorney, Agent, or Firm* — Dykema Gossett PLLC

(57) ABSTRACT

The invention relates to a cooling unit for storing temperature-sensitive goods at a desired cooling temperature, comprising a cooling compartment (9) for storing the temperature-sensitive goods, an insulation (1) separating the cooling compartment (9) from an ambient space (10), a multi-stage cascade refrigeration system adapted to cool down the cooling compartment (9) to the desired cooling temperature and/or maintain the desired cooling temperature in the cooling compartment (9), said multi-stage cascade refrigeration system comprising at least a high-temperature refrigeration cycle (11) and a low-temperature refrigeration cycle (12), whereas said low-temperature refrigeration cycle (12) comprises a low-temperature evaporator (13) arranged to absorb heat from the cooling compartment (9), and whereas the high-temperature refrigeration cycle (11) comprises a high-temperature condenser (14) arranged to reject heat to the ambient space (10), whereas a high-temperature evaporator (3) of the high-temperature refrigeration cycle (11) is thermally coupled to a low-temperature condenser (4) of the low-temperature refrigeration cycle (12) in order to form an intercooler, whereas said high-temperature evaporator (3) and/or said low-temperature condenser (4) are/is thermally coupled to the insulation (1).

12 Claims, 2 Drawing Sheets

(56) References Cited

U.S. PATENT DOCUMENTS

2011/0023532 A1 2/2011 Kobayashi et al.
2016/0187038 A1 6/2016 Toyooka

FOREIGN PATENT DOCUMENTS

GB 2 180 921 A 4/1987
JP 2000 105047 A 4/2000
JP 2012087952 A 5/2012

* cited by examiner

COOLING UNIT

CROSS-REFERENCE TO RELATED APPLICATION

This application is a national stage filing based upon International application No. PCT/EP2022/051031, filed 18 Jan. 2022, which claims the benefit of priority to Europe application No. 21152370.9, filed 19 Jan. 2021.

FIELD OF THE INVENTION

The present invention relates to a cooling unit for storing temperature-sensitive goods at a desired cooling temperature, said cooling unit comprising a cooling compartment for storing the temperature-sensitive goods, an insulation separating the cooling compartment from an ambient space, a multi-stage cascade refrigeration system adapted to cool down the cooling compartment to the desired cooling temperature and/or maintain the desired cooling temperature in the cooling compartment, said multi-stage cascade refrigeration system comprising at least a high-temperature refrigeration cycle and a low-temperature refrigeration cycle, whereas said low-temperature refrigeration cycle comprises a low-temperature evaporator arranged to absorb heat from the cooling compartment, and whereas the high-temperature refrigeration cycle comprises a high-temperature condenser arranged to reject heat to the ambient space, whereas a high-temperature evaporator of the high-temperature refrigeration cycle is thermally coupled to a low-temperature condenser of the low-temperature refrigeration cycle in order to form an intercooler of said high-temperature refrigeration cycle and said low-temperature refrigeration cycle.

STATE OF THE ART

Cooling units operating based on multi-stage cascade refrigeration systems are generally known. Stationary cooling units, for example, may employ two-stage cascade refrigeration systems comprising a low-temperature refrigeration cycle and a high-temperature refrigeration cycle in order to establish and maintain a desired cooling temperature, which lies well below an ambient temperature of the cooling unit.

However, such cooling units provide comparably low cooling power at very low temperatures. Since, due to great differences between typical ambient and desired cooling temperatures, very low evaporation temperatures are required at the evaporator of the low-temperature refrigeration cycle, solely the cooling capacity of the low-temperature refrigeration cycle is used for direct cooling of the unit's cooling compartment. Overall, energy efficiency of such cooling units is low and specific installation costs per cooling power are high.

Moreover, as direct cooling is provided only inside the cooling compartment, such cooling units typically are characterised by comparatively low cooling-down speeds and rather frequently occurring instabilities of the desired cooling temperature, which may be attributed to pressure peaks inside the high- and low-temperature refrigeration cycles.

OBJECTIVE OF THE INVENTION

It is therefore an object of the present invention to provide a cooling unit which operates based on a multi-stage cascade refrigeration system but has improved energy efficiency and cooling-down speed, and avoids unwanted pressure peaks inside the respective refrigeration cycles.

Further objects of the present invention will become apparent from the description.

PRESENTATION OF THE INVENTION

In the case of a cooling unit for storing temperature-sensitive goods at a desired cooling temperature, said cooling unit comprising a cooling compartment for storing the temperature-sensitive goods, an insulation separating the cooling compartment from an ambient space, a multi-stage cascade refrigeration system adapted to cool down the cooling compartment to the desired cooling temperature and/or maintain the desired cooling temperature in the cooling compartment, said multi-stage cascade refrigeration system comprising at least a high-temperature refrigeration cycle and a low-temperature refrigeration cycle, whereas said low-temperature refrigeration cycle comprises a low-temperature evaporator arranged to absorb heat from the cooling compartment, and whereas the high-temperature refrigeration cycle comprises a high-temperature condenser arranged to reject heat to the ambient space, whereas a high-temperature evaporator of the high-temperature refrigeration cycle is thermally coupled to a low-temperature condenser of the low-temperature refrigeration cycle in order to form an intercooler of said high-temperature refrigeration cycle and said low-temperature refrigeration cycle, the aforementioned object is achieved in that said high-temperature evaporator and/or said low-temperature condenser are/is thermally coupled to the insulation.

In contrast to the prior art, the cooling unit according to the present invention does not only allow heat transfer between the low-temperature condenser and the high-temperature evaporator, i.e. within the intercooler, but it additionally allows direct heat absorption from the insulation. This is achieved in that the low-temperature condenser and the high-temperature evaporator are not only thermally coupled to each other, as in the prior art, but also to said insulation. Consequently, heat is directly absorbed not only from the cooling compartment but also from the insulation. Heat which is in transfer from the ambient space into the cooling compartment will therefore, at least partially, be absorbed at the intercooler. Since the evaporation temperature of the intercooler typically is, by far, higher than the evaporation temperature of the low-temperature evaporator, direct cooling of the insulation at the intercooler requires less power input than cooling the cooling compartment by means of the high-temperature evaporator. By these means, energy consumption can be reduced by 15% or more as compared to prior-art cooling units. Thus, smaller, less powerful and therefore cheaper compressors may be used within said refrigeration cycles. Moreover, by removing heat not only from the cooling compartment by means of the low-temperature refrigeration cycle having comparably low cooling capacity, but also from the insulation between the cooling compartment and the ambient space by means of the high-temperature refrigeration cycle having comparably high cooling capacity, operation of the low-temperature refrigeration cycle is not (or less often) required in part-load operation mode of the cooling unit, i.e. when the desired cooling temperature is set to a temperature higher than the lowest possible cooling temperature. In addition to the corresponding decrease of energy consumption, this also increases temperature stability inside the cooling compartment in part-load operation mode.

According to a preferred embodiment of the cooling unit, the high-temperature evaporator and/or the low-temperature condenser are/is thermally coupled to the insulation by means of a heat collector, whereas said heat collector is either arranged inside the insulation or in contact with a surface of the insulation, preferably an outer surface of the insulation with respect to the cooling compartment.

This embodiment facilitates the required thermal coupling of the intercooler to the insulation by arranging the heat collector inside the insulation, i.e. by integrating said heat collector into the insulation wall separating the cooling compartment from the ambient space, or by attaching said heat collector to a surface, preferably an outer surface, of the insulation. This facilitates effective heat absorption from the insulation.

According to a preferred embodiment of the cooling unit, the heat collector has the shape of a plate, preferably the shape of a flat, bent, or curved plate protruding from the high-temperature evaporator and/or the low-temperature condenser.

Such plate-formed realisations of the heat collector allow for particularly effective heat absorption from the insulation due to the design of a thermally active surface of such a heat collector. Preferably, the heat collector may be realised by a plate which is attached to the low-temperature condenser and/or to the high-temperature evaporator and is arranged in an essentially vertical position within the insulation or at a surface of the insulation. Thereby, the form of the heat collector may correspond to the design of the insulation. It is also possible that the intercooler is arranged outside the insulation, and merely the heat collector protrudes, at least partially, from the intercooler into said insulation.

Preferably, such heat collectors may be designed and arranged like a sleeve for the cooling compartment.

According to a preferred embodiment of the cooling unit, the heat collector encloses or surrounds the cooling compartment like a wall or a box.

This ensures maximum heat absorption from the insulation, since heat from the ambient space penetrating the insulation towards the cooling compartment cannot bypass the heat collector. Alternatively, the heat collector may enclose or surround the cooling compartment only in sections, which allows for the design of particularly cost-efficient embodiments of the cooling unit.

Thereby, the heat collector may be attached to the outer surface of the insulation, or to the outer surface of an outermost layer of said insulation with respect to the cooling compartment. This facilitates the manufacturing process of the cooling unit while increased energy efficiency, improved cooling-down speed as well as the reduction of temperature fluctuations within the cooling compartment are nevertheless guaranteed.

According to a preferred embodiment of the cooling unit, the thermally active surface of the heat collector is larger than, preferably at least twice as large as, a thermally active surface of the high-temperature evaporator and/or the low-temperature condenser.

While thermal coupling of the intercooler and the insulation can be achieved, for instance, by simply guiding the low-temperature condenser and/or the high-temperature evaporator through (or along) the insulation without any thermal shielding, in such embodiments the thermally active surface of the low-temperature condenser and/or the high-temperature evaporator made available for heat absorption from the insulation is rather small. For instance, in embodiments where both the low-temperature condenser and the high-temperature evaporator are thermally coupled to the insulation, the thermally active surface would be constituted by the shell surfaces of the tubes forming the low-temperature condenser and the high-temperature evaporator running inside the insulation. However, by making use of a separate heat collector, this active thermal surface may, in principle, be given any desired form and size. In particular, a heat collector comprising one or more joint or disjoint, plate-formed structures can provide for a thermally active surface of convenient size.

In order to increase thermal mass and thus thermal inertia, the heat collector is preferably made of metal. Particularly well suited metals are aluminium, copper, stainless steel and steel, as well as alloys thereof.

According to a preferred embodiment of the cooling unit, the heat collector is thermally coupled to the high-temperature evaporator and/or the low-temperature condenser by means of soldering, brazing, welding, gluing, or clipping, or combinations thereof.

This facilitates the manufacturing process of the cooling unit and saves manufacturing costs.

In order to thermally couple the high-temperature evaporator and the low-temperature condenser to each other, either tube-on-tube or tube-in-tube designs can be chosen. This means that the tube or tube section of the low-temperature refrigeration circuit constituting the low-temperature condenser is either guided along (tube-on-tube) or within (tube-in-tube) the tube or tube section of the high-temperature refrigeration circuit constituting the high-temperature evaporator, such that the thermal coupling is facilitated by the area of contact between the respective shell surfaces of said tubes.

According to a preferred embodiment of the cooling unit, the intercooler has a tube-on-tube design, and the heat collector is thermally coupled to both the high-temperature evaporator and the low-temperature condenser.

By thermally connecting the heat collector to both the high-temperature evaporator and the low-temperature condenser, the heat collector will heat up to essentially the same temperature as the high-temperature evaporator and the low-temperature condenser. In reaction to any temperature change of the high-temperature evaporator and the low-temperature condenser, the heat collector will transfer its thermal energy to the high-temperature evaporator or the low-temperature condenser to equalize the temperatures again. By doing this, unwanted pressure peaks inside the high- and low-temperature refrigeration cycles will be eased or compensated in a very effective way. As an effect, the temperature within the cooling compartment will be kept more stable, especially when the high-temperature refrigeration cycle operates with compressor-on/off regulation.

Similarly, a tendency towards thermal equilibrium between the heat collector and the intercooler will also have beneficial effects in another preferred embodiment of the cooling unit, in which the intercooler has a tube-in-tube design, and the heat collector is thermally coupled only to the high-temperature evaporator or the low-temperature condenser.

This will also lead to a certain degree of stabilisation of the temperature inside the cooling compartment due to heat transfer from between the heat collector and the high-temperature evaporator or the low-temperature condenser.

In order to thermally isolate the cooling compartment from the ambient space, the insulation of the cooling unit may be made of cyclopentane foam, polyurethane foam, polystyrene, vacuum-panels, or mineral wool, or combinations thereof.

According to a preferred embodiment of the cooling unit, the multi-stage cascade refrigeration system is realised as a two-stage cascade refrigeration system comprising the high-temperature refrigeration cycle and the low-temperature refrigeration cycle, which cycles are coupled to each other at the intercooler.

Employing a two-stage cascade refrigeration system renders the cooling unit suitable for operation in connection with a wide range of ambient temperatures in a particularly efficient manner. While having a design simple and robust enough for being employed in both stationary and portable cooling units, it allows for the desired temperature difference to be split into two steps by utilising two thermally connected refrigeration systems of standard built, e.g. two vapour-compression refrigeration systems, to cool down from ambient temperature of the cooling unit's ambient air to an intermediate temperature, also called intercooler temperature, in a first step, and from said intermediate temperature down to the target temperature of the cooling unit, also called desired cooling temperature, in a second step. Thereby, one can rely purely on standard components found in other devices used in light commercial cooling industry, without losing reliability due to overloading when dealing with the kind of temperature differences which are particularly relevant for independent portable cooling units.

According to a preferred embodiment of the cooling unit, said cooling unit is a portable cooling unit for transporting temperature-sensitive goods while maintaining the desired cooling temperature.

As such, said portable cooling unit may comprise
- the multi-stage cascade refrigeration system adapted to operate during transport of the portable cooling unit and to cool down to and maintain temperatures of more than 70 K, preferably more than 120 K, below ambient temperature,
- a suspension system adapted and arranged to serve as elastic bearing for the multi-stage cascade refrigeration system and/or for components of the multi-stage cascade refrigeration system,
- a movement delimiting system adapted and arranged to restrict movement of the multi-stage cascade refrigeration system and/or the components of the multi-stage cascade refrigeration system,
- an impact protection system adapted and arranged to dampen collisions between the multi-stage cascade refrigeration system and other parts of the portable cooling unit, and/or between the components of the multi-stage cascade refrigeration system,
- a lubrication system facilitating lubrication of the components of the multi-stage cascade refrigeration system for inclinations of the portable cooling unit of at least 10°, preferably of more than 20°, out of horizontal orientation, and
- a monitoring system adapted to generate an alarm signal upon malfunction of the portable cooling unit.

Due to this particular combination of features, the cooling unit becomes particularly well suited for portable applications. The employed multi-stage cascade refrigeration system provides for sufficient cooling power and the realisation and maintenance of the desired or required cooling temperature, i.e. target temperature; the suspension system, the movement delimiting system, and the impact protection system act as special means of protection for the multi-stage cascade refrigeration system during transport of the cooling unit, thereby rendering said multi-stage cascade refrigeration system suitable for operation during transport of the cooling unit and thus rendering the cooling unit portable; the lubrication system reliably prevents malfunction of the multi-stage cascade refrigeration system in inclined positions, which the portable cooling unit will assume quite commonly during transport; and the monitoring system secures protection of the temperature-sensitive goods in case of malfunction of the cooling unit, since it allows for early detection of the malfunction and for swift measures to be taken.

The term "portable" means within the scope of the present invention that the cooling unit is able to normally operate during transportation, particularly when the cooling unit is inclined by at least 10° out of horizontal orientation.

In a preferred embodiment of the portable cooling unit, its weight is 50 kg or less.

This facilitates handling of the portable cooling unit by the responsible personnel, since high weight would increase the risk of injuries or damage, and would increase roughness of the handling.

In a preferred embodiment of the portable cooling unit, it comprises at least one, preferably two, handles for easy handling of the portable cooling unit.

This further increases handling safety and stability of the cooling unit during transport. In particular, the cooling unit may be kept in horizontal orientation more easily, thus minimising the risk of malfunction of the multi-stage cascade refrigeration system and its components during transport.

In another preferred embodiment of the portable cooling unit, a high-temperature refrigeration cycle of the two-stage cascade refrigeration system comprises a first compressor featuring a cooling capacity of 60 W at an ambient temperature of 43° C. at the cycle's condenser, and an intercooler temperature of −25° C. at the cycle's evaporator.

In another preferred embodiment of the cooling unit, a low-temperature refrigeration cycle of the two-stage cascade refrigeration system comprises a second compressor featuring a cooling capacity of 30 W at an intercooler temperature of −25° C. at the cycle's condenser, and a target temperature of −80° C. at the cycle's evaporator.

This design of the two-stage cascade refrigeration system enables the cooling unit to quickly cool down the highly temperature-sensitive goods to the target or desired cooling temperature, and to maintain said temperature without overloading the refrigeration cycles (e.g. the two vapour-compression refrigeration systems).

The high-temperature refrigeration cycle can be designed to feature a heat dissipation between the condenser and ambient air of 120 W with a temperature difference of 10K, and a heat intake at the evaporator (i.e. intercooler) of 60 W with a temperature difference of 5K. The low-temperature refrigeration cycle, on the other hand, can be designed to feature a heat dissipation at the condenser (i.e. intercooler) of 60 W with a temperature difference of 5K, and a heat intake from the cooling compartment to the evaporator of 30 W with a temperature difference of 10K.

By means of such a design, the cooling unit is enabled to quickly re-establish the target temperature after the cooling process has been interrupted, e.g. after a door of the cooling compartment has been opened.

In another preferred embodiment of the cooling unit, the high-temperature refrigeration cycle of the two-stage cascade refrigeration system features Propane as refrigerant, and the low-temperature refrigeration cycle of the two-stage cascade refrigeration system features Ethane as refrigerant.

With the combination of these particular refrigerants for the high- and low-temperature refrigeration cycles, the two-stage cascade refrigeration system may be operated in a particularly effective manner, particularly under varying external conditions as they are encountered during transportation.

In another preferred embodiment of the cooling unit, each refrigeration cycle's compressor features a motor-compression-unit which is elastically suspended inside the respective compressor's housing by means of multiple springs.

Thereby, vibration and sound transmission between the motor-compression-unit and the compressor's housing may be minimized. Furthermore, by elastically suspending the motor-compression unit inside the respective compressor housing, said compressor becomes particularly well suited for portable uses since different orientations and/or positions of the compressor do not affect the operability of the motor-compression unit. Furthermore, since the elastic suspension can be facilitated by a plurality of springs which are supported at the base of the compressor housing, these springs are submerged, at least partially, into a lubricant sump (or oil sump) covering the base in the operating state of the compressor, which further dampens the vibration and sound transmission.

In another preferred embodiment of the cooling unit, said motor-compression unit features multiple spacer elements made of elastic material, said spacer elements being arranged on a surface of the motor-compression-unit and protruding from said surface towards the compressor's housing.

Said elastic spacer elements serve as dedicated means of protection against collisions between the motor-compression unit and the respective compressor's housing. Such protection is necessary for rendering the cooling unit portable, i.e. being able to normally operate during transport, despite of varying orientations and positions the cooling unit may take during transport. As such, the spacer elements may serve as impact protection system. Said elastic spacer elements may as well serve as movement delimiting system, since the dimensions of the spacer elements may be chosen such that only a predefined displacement from the motor-compression unit's resting position is allowed.

In another preferred embodiment of the cooling unit, said compressor features a lubricant receptacle which is attached to a crankshaft of said motor-compression unit such that the lubricant receptacle protrudes at least in portions into the lubricant sump of said compressor.

In this way, steady lubrication of the motor-compression unit can be guaranteed even when the cooling unit is not in horizontal orientation. In such situations, the lubricant receptacle still protrudes at least in portions into said lubricant sump covering the base of the compressor housing in the operating state of the compressor, thus facilitating steady lubricant supply to the critical components that require lubrication. The lubricant may be conveyed from the sump to the critical components by standard means for lubricant conveyance, e.g. grooves in the crankshaft's surface, eccentric bores and/or outlet openings within the crankshaft.

In a preferred embodiment, the lubricant may enter the lubricant receptacle and the crankshaft through an inlet opening of said lubricant receptacle and may form a lubricant paraboloid upon rotation of the crankshaft—which also leads to a rotation of the lubricant receptacle attached to the crankshaft. The lubricant may then exit the interior of a rotationally symmetric, hollow region of the crankshaft through an outlet opening which is arranged at the high point of the lubricant paraboloid in the crankshaft's outer surface. From there, the lubricant may either be directed towards critical components of the motor-compression unit that need lubrication, or it may be guided into further means of conveyance, e.g. grooves in the crankshaft's surface.

BRIEF DESCRIPTION OF THE FIGURES

Exemplary embodiments of the invention are described below. Thereby, reference is made to the following drawings.

WAYS OF CARRYING OUT THE INVENTION

Figure 1:
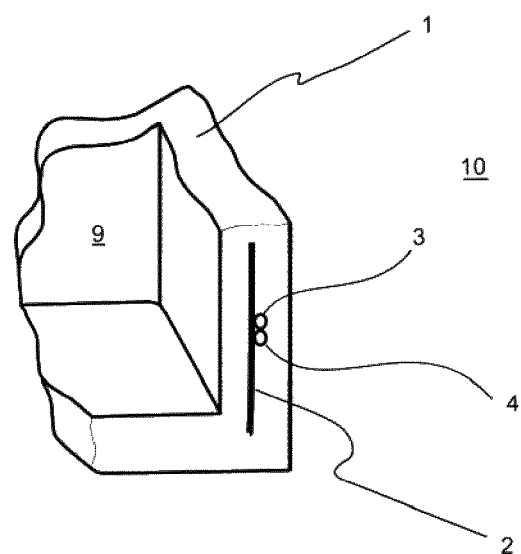
FIG. 1 a sectional view of the cooling unit's insulation

FIG. 1 shows a sectional view of an insulation 1 of the present invention's cooling unit. Said insulation 1 separates a cooling compartment 9 from an ambient space 10, whereas in typical applications an ambient temperature prevailing in the ambient space 10 is much higher than a temperature prevailing inside the cooling compartment 9.

In order to cool down the cooling compartment 9 to a desired cooling temperature, and/or to maintain said desired cooling temperature, the cooling unit comprises a multi-stage cascade refrigeration system. As in the embodiment schematically shown in FIG. 2, this multi-stage cascade refrigeration system can be realised as a two-stage cascade refrigeration system comprising a low-temperature refrigeration cycle 12 and a high-temperature refrigeration cycle 11. Thereby, each refrigeration cycle may be realised as a complete vapour-compression refrigeration system of standard built.

Said low-temperature refrigeration cycle 12 comprises a low-temperature evaporator 13 arranged to absorb heat from the cooling compartment 9, and said high-temperature refrigeration cycle 11 comprises a high-temperature condenser 14 arranged to reject heat to the ambient space 10. Moreover, a high-temperature evaporator 3 of the high-temperature refrigeration cycle 11 is thermally coupled to a low-temperature condenser 4 of the low-temperature refrigeration cycle 12 in order to form an intercooler of said two-stage refrigeration cycle.

According to the present invention, said high-temperature evaporator 3 and/or said low-temperature condenser 4 are/is thermally coupled to the insulation 1. In other words, the intercooler of the two-stage refrigeration circuit is thermally coupled to the insulation 1.

Figure 2:
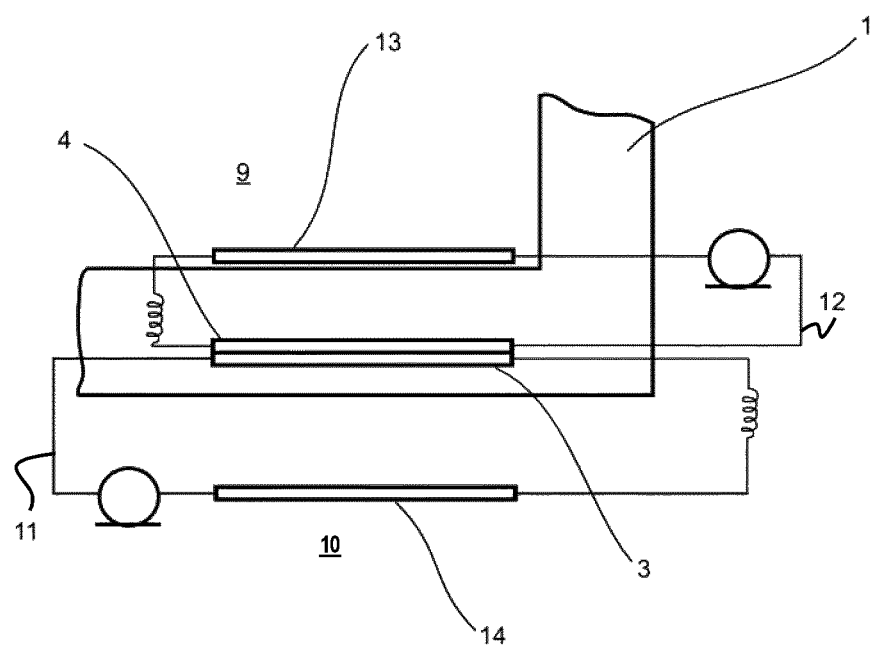
FIG. 2 a schematic diagram of the cooling unit's two-stage cascade refrigeration system FIG. 3 another schematic drawing of the cooling unit's intercooler and heat collector in frontal view FIG. 4 another schematic drawing of the cooling unit's intercooler and heat collector in frontal view FIG. 5 a schematic drawing of the cooling unit's intercooler and heat collector

This can be achieved, for instance, by arranging the intercooler inside the insulation 1, without thermally isolating the intercooler, as shown in FIG. 2. In this way, heat is not only directly absorbed from the cooling compartment 9 by means of the low-temperature evaporator 13, but also from the insulation 1 by means of the high-temperature evaporator 3. Since the high-temperature refrigeration cycle 11 typically has much higher cooling capacity than the low-temperature refrigeration cycle 12, and since direct cooling of the insulation 1 requires much less energy input than direct cooling of the cooling compartment 9, removing heat directly from the insulation 1 by means of the intercooler is much more energy efficient than removing heat from the cooling compartment 9 by means of the low-temperature evaporator 13.

According to FIG. 1 the thermal coupling between the intercooler and the insulation 1 is facilitated by means of a separate heat collector 2. Said heat collector 2 is thermally coupled to the insulation 1, and, since the intercooler of this embodiment has a tube-on-tube design, to both the high-temperature evaporator 3 as well as to the low-temperature condenser 4.

Figure 3:
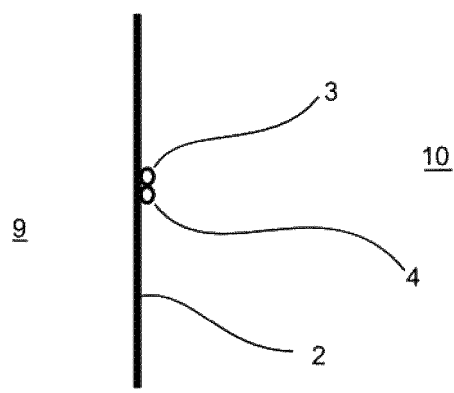
Figure 4:
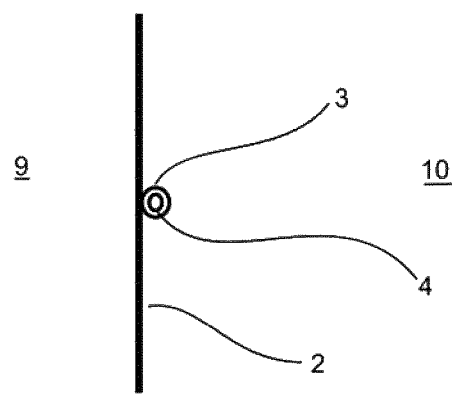

In other embodiments of the cooling unit, the intercooler may have a tube-in-tube design, as schematically depicted in FIG. 4. In such embodiments, said heat collector 2 may be coupled either to the low-temperature condenser 4 or to the high-temperature evaporator 3. A direct comparison of such arrangements may be made based on the schematic FIG. 3 (tube-on-tube) and FIG. 4 (tube-in-tube).

Figure 5:
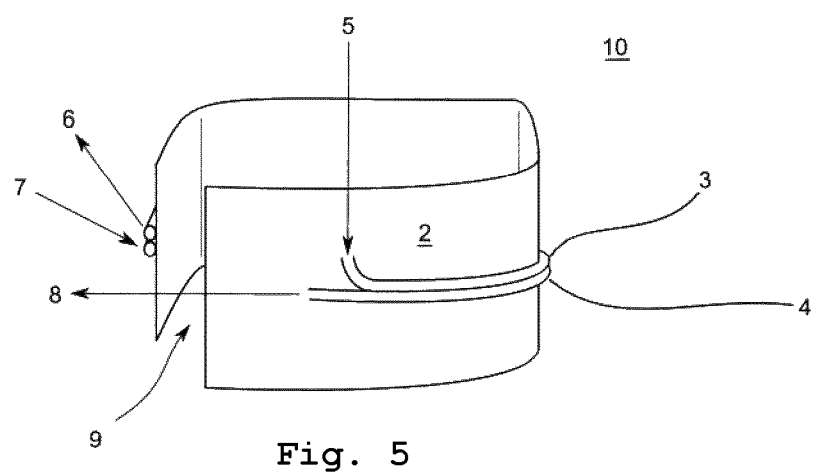

In FIG. 1, however, said heat collector 2 is integrated into the insulation 1. Thereby, the heat collector 2 is realised as a metal plate bent in such a manner that the heat collector 2 surrounds the cooling compartment 9 like a wall. A correspondingly designed heat collector 2 is shown in FIG. 5. Such a design practically shields the cooling compartment 9 from heat penetrating the insulation 1 from the ambient space.

As can be seen from FIG. 5, the two-stage cascade refrigeration system's intercooler is guided along and contacts the heat collector 2, whereas said intercooler is realised by those sections of the respective tubes embodying the high-temperature evaporator 3 and the low-temperature condenser 4, which sections are in contact with each other.

Moreover, FIG. 5 also indicates the flow direction of refrigerant circulating within the high-temperature refrigeration cycle 11, i.e. its flow direction 5 upon entering the high-temperature evaporator 3, its flow direction 6 upon leaving the high-temperature evaporator 3, its flow direction 7 upon entering the low-temperature condenser 4, and its flow direction 8 upon leaving the low-temperature condenser 4.

Alternatively to the arrangement shown in FIG. 1, the heat collector 2 may also be attached to an outer surface of the insulation 1, such that the heat collector 2 surrounds or encloses the cooling compartment 9 and the insulation 1.

LIST OF REFERENCE SIGNS

1 Insulation
2 heat collector
3 high-temperature evaporator
4 low-temperature condenser
5 flow direction of refrigerant entering the high-temperature evaporator
6 flow direction of refrigerant leaving the high-temperature evaporator
7 flow direction of refrigerant entering the low-temperature condenser
8 flow direction of refrigerant leaving the low-temperature condenser
9 Cooling compartment
10 Ambient space
11 high-temperature refrigeration cycle
12 low-temperature refrigeration cycle
13 low-temperature evaporator
14 high-temperature condenser

The invention claimed is:

1. A cooling unit for storing temperature-sensitive goods at a desired cooling temperature, said cooling unit comprising
a cooling compartment for storing the temperature-sensitive goods,
an insulation separating the cooling compartment from an ambient space,
a multi-stage cascade refrigeration system adapted to cool down the cooling compartment to the desired cooling temperature and/or maintain the desired cooling temperature in the cooling compartment, said multi-stage cascade refrigeration system comprising at least a high-temperature refrigeration cycle and a low-temperature refrigeration cycle,
wherein said low-temperature refrigeration cycle comprises a low-temperature evaporator arranged to absorb heat from the cooling compartment, and whereas the high-temperature refrigeration cycle comprises a high-temperature condenser arranged to reject heat to the ambient space,
wherein a high-temperature evaporator of the high-temperature refrigeration cycle is thermally coupled to a low-temperature condenser of the low-temperature refrigeration cycle in order to form an intercooler of said high-temperature refrigeration cycle and said low-temperature refrigeration cycle,
wherein a heat exchanger selected from the group consisting of said high-temperature evaporator and said low-temperature condenser is thermally coupled to the insulation, wherein the heat exchanger is thermally coupled to the insulation by means of a heat collector, wherein said heat collector is either arranged inside the insulation or in contact with a surface of the insulation, wherein a thermally active surface of the heat collector is larger than a thermally active surface of the heat exchanger, and wherein the thermally active surface of the heat collector is at least twice as large as the thermally active surface of the heat exchanger.

2. The cooling unit according to claim 1, wherein the the heat collector has the shape of a plate.

3. The cooling unit according to claim 1, wherein the heat collector surrounds the cooling compartment at least in sections like a wall.

4. The cooling unit according to claim 1, wherein the heat collector is made of metal.

5. The cooling unit according to claim 1, wherein the heat collector is thermally coupled to the heat exchanger selected from the group consisting of the high-temperature evaporator and/or the low-temperature condenser by means of soldering, brazing, welding, gluing, or clipping.

6. The cooling unit according to claim 1, wherein the intercooler has a tube-on-tube design, and the heat collector is thermally coupled to both the high-temperature evaporator and the low-temperature condenser.

7. The cooling unit according to claim 1, wherein the intercooler has a tube-in-tube design, and the heat collector is thermally coupled only to the high-temperature evaporator or the low-temperature condenser.

8. The cooling unit according to claim 1, wherein the insulation comprises cyclopentane foam, polyurethane foam, polystyrene, vacuum-panels, or mineral wool.

9. The cooling unit according to claim 1, wherein the multi-stage cascade refrigeration system is realised as a two-stage cascade refrigeration system comprising the high-temperature refrigeration cycle and the low-temperature refrigeration cycle.

10. The cooling unit according to claim 1, wherein said cooling unit is a portable cooling unit for transporting temperature-sensitive goods while maintaining the desired cooling temperature.

11. The cooling unit according to claim 1, wherein said heat collector is arrangved in contact with an outer surface of the insulation with respect to the cooling compartment.

12. The cooling unit according to claim 2, wherein the heat collector has the shape of a flat or curved plate protruding from the heat exchanger selected from the group consisting of the high-temperature evaporator and the low-temperature condenser.

\* \* \* \* \*